July 10, 1934.                M. J. LEWIS                1,966,301
ELECTRIC METER SERVICE BOX
Filed June 1, 1932
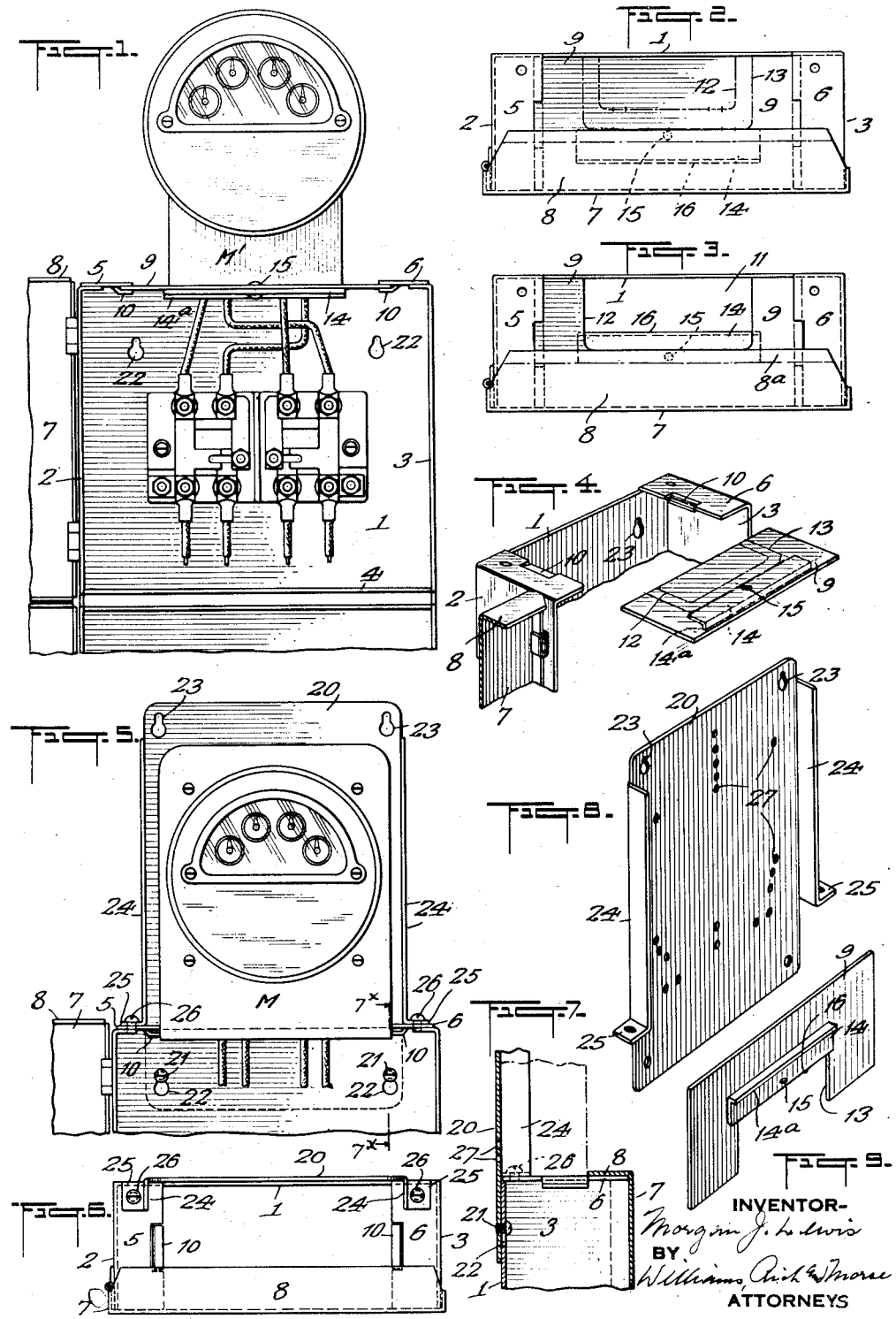
INVENTOR-
Morgan J. Lewis
BY
Williams, Rich & Morse
ATTORNEYS Patented July 10, 1934

1,966,301

UNITED STATES PATENT OFFICE 1,966,301

ELECTRIC METER SERVICE BOX

Morgan J. Lewis, Philadelphia, Pa., assignor to Code Electric Products Corporation, York, Pa., a corporation of Pennsylvania Application June 1, 1932, Serial No. 614,719

5 Claims. (Cl. 247—2)

In the installation of electric service which includes electric wiring in buildings for supplying current either for power purposes, or for domestic use, it is customary to bring the power lines to a central distributing point and there provide a meter. My invention has for its object to provide an improved type of box forming an enclosure for the meter test block and its connections and a mounting for the meter, whereby its indicators may be readily observed by service company employees, and completely enclosing the lower end of the meter and preventing tampering with the wiring connections thereto by unauthorized persons.

A further object of my invention is to provide, in cooperation with the cover of the box and one of its side walls, an adapter which is so arranged that the box may be utilized in conjunction with any one of a variety of standard meters and one of the latter mounted in connection with the box without the use of special tools in fitting these parts together.

To these and other ends my invention consists in certain improvements and arrangements of parts all as will be further described, the novel features being pointed out in the appended claims.

In the drawing:

Fig. 1 is a front elevation showing an electric meter associated with a service box embodying my present invention, the door of the box being open; Fig. 2 is a top plan view of the service box, the door being closed; Fig. 3 is a similar view showing an aperture provided in the adapter plate and the filler strip carried on the latter; Fig. 4 is a perspective view of the upper end of the box and the cooperating adapter plate; Fig. 5 is a view similar to Fig. 1, illustrating the meter mounting plate; Fig. 6 is a top plan view thereof, the meter being omitted and the door of the box being in closed position; Fig. 7 is a fragmentary sectional view taken on the line $7x$—$7x$ of Fig. 5; Fig. 8 is a perspective view of the meter mounting plate; Fig. 9 is a view similar to Fig. 3, showing the adapter plate reversed and its filler strip adjusted for use when a meter has been removed to provide a blank end wall. In the drawing the several reference characters indicate similar parts.

In wiring buildings for electric service in accordance with established standards it is desirable to provide, in conjunction with the usual switch box from which the distributing circuits lead, a separate service box associated with the meter containing the distributing block from which the meter circuits lead and to so arrange these parts that the connections to the meter are inaccessible to other than the service company's employees. In practice considerable difficulty and expense is often encountered by electricians to avoid which I have provided a type of service box having interior features whereby it may be placed in juxtaposition to the meter, and will accommodate meters of various sizes, or those having bases of different dimensions, and thus obviate the necessity of providing conduits for protecting the circuit wires which otherwise lead from the box to the meter.

In carrying out my invention, I provide a rectangular service box which is preferably constructed of sheet metal and has an open front which is normally closed by a door which is locked and sealed. For convenience in reference the box is described as comprising a bottom 1, side walls 2 and 3, a bottom wall 4 and a top which is formed by two flanges 5 and 6 which extend inwardly from the side walls. The door is indicated generally by 7. As shown in Fig. 5 the general dimensions of the box are such that the distance between the inner edges of the top wall flanges 5 and 6 is sufficient to accommodate the base of a large standard meter in general service. The box may be of any desired depth, and I provide on the upper edge of the door 7 a flange 8 which, when the door is closed, extends over forward portions of the top wall flanges, and is of such depth that its inner edge will engage with the face of the base of the meter M.

In order to accommodate meters of a smaller size or those having bases of lesser width and depth, such as the meter M' illustrated in Fig. 1, I provide an adapter plate 9 which is carried at its ends in guideways 10 on the contiguous edges of the flanges 5 and 6. This plate has a width equal to the depth of the box and normally completely closes the top thereof, being held against removal by engagement with the guides 10 and the inner face of the door 7. An aperture 11 is provided in the inner edge of the plate to accommodate the base of a meter of given size. However, as the electrician installing the service box seldom places the meter, this work being subsequently performed by the service company, I provide the plate with a plurality of knockouts as indicated by the broken lines 12 and 13 (Figs. 2 and 4), either one of which may be removed to accommodate the particular meter which may be supplied. For the same reason I provide on the edge of the door flange 8 a tearing strip $8^a$ which may be removed along the scored line $8^b$ (Figs. 2 and 3). On the boxes as they are distributed to the trade the inner edge of the top flange of the door is in alinement with the scoring 13 which delineates the larger aperture 11 (Fig. 3), and the scoring for the tearing strip 8ª is so located that, if the meter installer removes it, the aperture in the top of the box will have the dimensions shown in Fig. 6.

In original meter installations the installer makes the aperture 11 of the exact size required. However, as it frequently happens that the electric service under one contract is discontinued and the meter removed and a different or another type of meter thereafter installed, it is necessary to provide, for the convenience of the installers of meters on subsequent occasions, means for reducing the area of the aperture 11 as occasion requires. For this reason I mount on the lower side of the plate 9 a strip of metal 14 in such a position that its inner edge is in line with the bottom of the aperture formed by the larger knockout 13. This plate 14 is pivoted intermediate the sides of the smallest meter base to be accommodated, as at 15, and is of such width that, when rotated through an arc of 180°, its outer edge 16 will occupy the position indicated for the bottom of the smaller aperture formed by the knockout 12.

As I deem it desirable to completely close the top of the box when a meter has been removed to render the circuit terminals therein inaccessible, pending the installation of a new meter, I have so arranged the parts above described that, by withdrawing the adapted plate and inserting it in the reverse position, the aperture 11 therein will be covered by the door flange 8 and the filler strip 14. However, if the adapted plate is inserted so that the strip 14 is on its lower side, it is possible for a mischievous party, using a suitable instrument, to rotate it slightly to provide a triangular opening. This may be easily prevented by turning the adapter plate over to bring the filler strip uppermost, as in this position its edge will lie parallel to and abut the adjacent edge of the flange 8 on the top of the door when the latter is closed. To provide against inaccuracies in manufacture, the usual clearance of the door flanges, or the possible springing of the door flange 3 and the adapter plate, which might enable the filler strip to be rotated to turn a portion of one of its ends beneath the flange 8, I provide it with an upturned edge 14ª (Fig. 9) which forms an abutment of substantial width cooperating with the door flange.

In the event the meter first used and removed is one of largest size, the top of tthe box will be closed by insertion of the complete adapter plate shown in Fig. 2. If the meter removed is one of the smallest size, it is sufficient to merely insert the plate in its reverse position, as the aperture formed by the knockouts 12 will be closed by the door flange 8 including the tearing strip 8ª. Again, in closing the box after the intermediate size meter has been removed, thus leaving the adapter plate with the opening bounded by the scoring lines 13, said plate will be turned around and turned over and the filling strip (which is now uppermost) will be rotated on its pivot to partially close the aperture, the remainder thereof being covered by the door flange 8 including the tearing strip 8ª the edge of which engages the flange 14ª and secures the filling strip against rotation.

It will be observed by the arrangement of the parts described that I provide in the first instance a box which is completely closed until the meter is installed and, by the removal of the plate 9, the removal of either of the knockouts, the removal of the tearing strip 8ª, and the adjustment of the filler strip 14, provision is made for the accommodation of several different types or sizes of meters.

I also provide a special meter mounting which comprises a plate 20 having its lower end extending behind the upper portion of the bottom 1 of the box to which it is attached by fastening devices, such as screws 21, engaging in the key hole shaped apertures 22 in the bottom of the box, which apertures are employed for the accommodation of screws or bolts for mounting the box on a suitable support when it is employed for other purposes than those described. At the upper corners of the plate 20 similar apertures 23 are located through which fastening devices may be passed to secure the plate and its attached box to a wall or other support. The meter mounting plate is provided at its opposite edges with short forwardly extending flanges 24 at the lower end of which are outwardly extending portions or feet 25 positioned to engage the top flanges 5 and 6 of the box, to which they are attached by screws or bolts 26. The plate 20 is preferably provided with a plurality of threaded apertures, indicated by the numeral 27, which are disposed in the manner indicated to accommodate the mounting screws of a variety of different meters.

What I claim is:

1. A mounting for electric meters comprising a service box having a rear wall and top side flanges extending inwardly from its side walls respectively to form an aperture adapted to accommodate a meter base, a plate for supporting the meter attached to the rear wall and projecting above the top of the box and having forwardly extending side portions resting upon and secured to said top side flanges respectively.

2. A mounting for electric meters comprising a service box having a rear wall and top side flanges extending inwardly from its side walls respectively to form an aperture adapted to accommodate a meter base, said rear wall being provided near its upper end with perforations for normally attaching it to a support, a plate for supporting the meter extending in rear of the box having fastening devices engaging through said perforations, forwardly extending flanges on the opposite sides of the plate having outwardly extending feet at their lower ends secured to said top side flanges respectively.

3. A meter service box having a meter adapting end wall having an aperture to accommodate a meter base of given size, and a filler strip to decrease the size of said aperture to accommodate a meter base of smaller size than the one first mentioned, said strip being pivoted to said wall intermediate the sides of said smaller size meter base to be accommodated whereby it may be rotatably adjusted to a position adapting it to be substantially engaged by said smaller size meter base and to be held thereby against rotational displacement.

4. A meter service box having a meter adapting end wall having two knockouts to form two apertures to accommodate two meter bases of different sizes respectively, and a filler strip to permit accommodating the smaller size meter base when the larger knockout is removed, said strip being pivotally carried by said wall and when rotatably adjusted to a position covering a portion of the larger knockout having an edge in registration with an edge of the smaller knockout, said strip being pivoted intermediate the ends of said registering edges whereby it is held against rotational displacement from its position of engagement with the smaller size meter base when the latter is fitted through said end wall.

5. A meter service box open at its front and having an open top provided with guideways, a removable adapter plate insertable in said guideways through the open front of the box and having an aperture, said plate in one position of adjustment in said guideways accommodating a meter base through said aperture, a filler strip pivotally adjustable on said plate to decrease the normal size of said aperture, and a door for closing the front of the box provided with a top flange extending rearwardly over said plate to hold it in said guideways, said plate in a second position of adjustment in said guideways and said filler strip in its position decreasing the normal size of said aperture covering the top of said box in cooperation with said door flange, said filler strip having a flange formed at one edge, said filler strip flange cooperating with the rear edge of said door flange in preventing rotational displacement of said filler strip from its said top covering position.

MORGAN J. LEWIS.